United States Patent
Heurtier

(10) Patent No.: US 8,093,996 B2
(45) Date of Patent: Jan. 10, 2012

(54) LABEL INCORPORATING A RF ANTI-THEFT ANTENNA AND AN UHF RFID TRANSPONDER

(75) Inventor: Eric Heurtier, Dampierre (FR)

(73) Assignee: All-Tag Security S.A., Manage (BE)

( * ) Notice: Subject to any disclaimer, the term of this patent is extended or adjusted under 35 U.S.C. 154(b) by 435 days.

(21) Appl. No.: 12/227,167

(22) PCT Filed: May 11, 2007

(86) PCT No.: PCT/FR2007/000805
§ 371 (c)(1),
(2), (4) Date: Jan. 12, 2009

(87) PCT Pub. No.: WO2007/135269
PCT Pub. Date: Nov. 29, 2007

(65) Prior Publication Data
US 2009/0231139 A1 Sep. 17, 2009

(30) Foreign Application Priority Data

May 12, 2006 (FR) .................................. 06 04272

(51) Int. Cl.
*G08B 6/00* (2006.01)
(52) U.S. Cl. ................. 340/407.2; 340/10.1; 340/568.1; 340/426.1
(58) Field of Classification Search ................ 340/407.2, 340/572.1–572.9, 568.1, 10.1, 10.5, 10.51, 340/10.3, 425.5, 426.1
See application file for complete search history.

(56) References Cited

U.S. PATENT DOCUMENTS

| | | | |
|---|---|---|---|
| 5,541,399 A * | 7/1996 | de Vall | 235/491 |
| 6,147,662 A | 11/2000 | Grabau et al. | |
| 6,837,438 B1 | 1/2005 | Takasugi et al. | |
| 6,854,647 B2 * | 2/2005 | Collins et al. | 235/383 |
| 7,075,437 B2 * | 7/2006 | Bridgelall et al. | 340/572.1 |
| 7,088,304 B2 * | 8/2006 | Endo et al. | 343/788 |
| 7,317,426 B2 | 1/2008 | Copeland et al. | |
| 7,368,033 B2 | 5/2008 | Eckstein et al. | |
| 7,498,948 B1 * | 3/2009 | Gudeman et al. | 340/572.8 |
| 2004/0089707 A1 | 5/2004 | Cortina et al. | |
| 2004/0263319 A1 | 12/2004 | Huomo | |
| 2006/0097874 A1 | 5/2006 | Salesky et al. | |
| 2006/0113397 A1 | 6/2006 | Beilenhoff et al. | |
| 2006/0158316 A1 | 7/2006 | Eckstein | |
| 2007/0012775 A1 | 1/2007 | Cote | |
| 2007/0030151 A1 * | 2/2007 | Morrow | 340/572.1 |
| 2007/0090955 A1 | 4/2007 | Cote et al. | |
| 2007/0098942 A1 | 5/2007 | Cote et al. | |
| 2007/0234553 A1 | 10/2007 | Cote et al. | |
| 2007/0238245 A1 | 10/2007 | Cote et al. | |
| 2008/0088417 A1 | 4/2008 | Smith et al. | |

FOREIGN PATENT DOCUMENTS

| | | |
|---|---|---|
| WO | WO 02/29929 A2 | 4/2002 |
| WO | WO 2004/104958 A1 | 12/2004 |
| WO | WO 2005/119617 A1 | 12/2005 |

* cited by examiner

*Primary Examiner* — Daniel Previl
(74) *Attorney, Agent, or Firm* — Breiner & Breiner, L.L.C.

(57) ABSTRACT

The present invention associates on one and the same label a UHF antenna and an RFID integrated circuit with an EAS antenna operating in RF mode, thus avoiding the addition of a second label on a product to be protected and/or traced. An aspect of the invention consists in using a loop antenna to which an integrated circuit which can operate by capacitive induction with the UHF antenna will be connected. The invention also relates to a method of manufacturing such a label, and to a method of using the label.

15 Claims, 4 Drawing Sheets

LABEL INCORPORATING A RF ANTI-THEFT ANTENNA AND AN UHF RFID TRANSPONDER

FIELD OF THE INVENTION

The object of the invention is to incorporate an RFID system that will ensure the traceability of objects or of goods on a label also having a standard RF anti-theft antenna operating between 5 and 10 MHz.

STATE OF THE ART

Some of the major concerns of warehouse and store managers regarding the flow of merchandise are, first, the traceability of an object (namely, its identification, location, and monitoring of its movement), and, second, its protection against theft, in particular at points of sale.

The first major concern is the protection of articles against theft at points of sale. Nowadays more and more anti-theft labels are incorporated into the article during its manufacture or packaging based on the principle of source tagging. Applying the anti-theft element at the source (i.e., during the manufacture or packaging of the article) eliminates the need to apply it at other stages in the commercial life of the product.

Several types of anti-theft systems exist on the market. The two biggest-selling systems worldwide are the radio-frequency (RF) anti-theft system with a coil or closed-loop antenna operating between 5 and 8.2 MHz, and the acoustic-magnetic system with an element operating at 58 KHz.

The EAS (Electronic Article Surveillance) systems transmit back a signal resonating through an antenna when said EAS systems travel through an alternative magnetic field whose frequency coincides with the antenna resonance frequency; this alternative magnetic field is supplied by terminals at store exits. In the current state of the art, the signal transmitted back by the EAS antenna does not include any identifier.

A second major concern of warehouse and store managers is the remote identification and location of an object inside a warehouse or store. Object identification is possible by means of the radio-frequency identification (RFID) systems. These systems include a reader and a transponder. The reader comprises a radio wave and magnetic field transmitter; it receives responses from transponders (transmitter-receiver) located within its reading field. The transponder comprises an integrated circuit, with or without a memory, and an antenna.

The RFID market is generally broken down based on the frequency ranges used:
 the low-frequency RFID (100-250 KHz)
 the high-frequency (HF) RFID (12 MHz-100 MHz)
 the ultra-high-frequency (UHF) RFID (400 MHz-2.45 GHz)

The UHF RFID is increasingly used to ensure the proper monitoring of objects or of consumer goods. To this end, a transponder comprising a UHF antenna and an integrated circuit is applied on the article or object to be tracked. The antenna is designed so that its inductance has a specific value such as to form a resonant circuit with the integrated circuit capacitance. The system communicates with receivers or readers whose transmitting power and operating frequency range must be adapted to the requirements of the laws and regulations in force in different countries.

In the current state of the art, the transponder is manufactured as a paper label, a cardboard tag, an adhesive label, a price tag, a garment data label, or other support. These labels are then added onto the product. This is described for example in U.S. Pat. No. 6,147,662 (Moore North America, Inc.) and in Patent Application WO 2005/119617 (Filtrona United Kingdom Ltd.). Now, while it is often worthwhile to be able to monitor a product either from its manufacture up until its sale or from the distribution centers up to the point of sale, it is nevertheless costly and laborious to add a new label to an article after its manufacture.

At present only the anti-theft element can be applied at the source, as the UHF element is added at a later stage in the marketing chain. Furthermore, there does not exist any product combining the HF RF anti-theft element and the UHF RFID element on a single impartible support or on one and the same label.

Several recent patent applications (US 2004/0089707, US 2004/0263319, WO 2004/104958) propose devices capable of incorporating the radiofrequency identification and anti-theft functions, and are characterized by a rather complex manufacturing and/or utilization method; Document WO 2004/104958 (Checkpoint Systems) relates to a "hard tag" type of device, used in particular to protect articles of clothing. Indeed, the manufacturing cost of such a device is a major concern, if this device is intended to be used for merchandise with a relatively low value.

OBJECT OF THE INVENTION

A first object of the present invention is a label capable of performing the functions of an anti-theft (EAS) label and a transponder of the UHF RFID type, characterized in that it comprises:
(a) a plastic sheet 4 as the substrate,
(b) an EAS loop antenna 2 capable of operating in radiofrequency mode,
(c) a transponder incorporating a UHF dipole antenna 3.

Another object is a manufacturing method for a label (called "RFID/anti-theft label") comprising the following steps:
(a) Manufacture of a loop antenna of the self-induction coil type on a first substrate;
(b) Positioning of an integrated circuit on said loop antenna, thus making a first assembly;
(c) Manufacture of an intermediate product made up of an RF EAS antenna and a UHF antenna, both applied, etched or fabricated on the same second substrate;
(d) Manufacture of a second assembly by positioning and affixing the first assembly made at step (b) onto the front side or the back side of said intermediate product opposite the UHF antenna made at step (c);
and in which steps (a) and (b) are performed sequentially, and in which step (c) may be performed before, at the same time as, or after steps (a) and (b).

Another object of the invention is a method of using such an RFID/anti-theft label.

DESCRIPTION OF THE INVENTION

Figure 1:
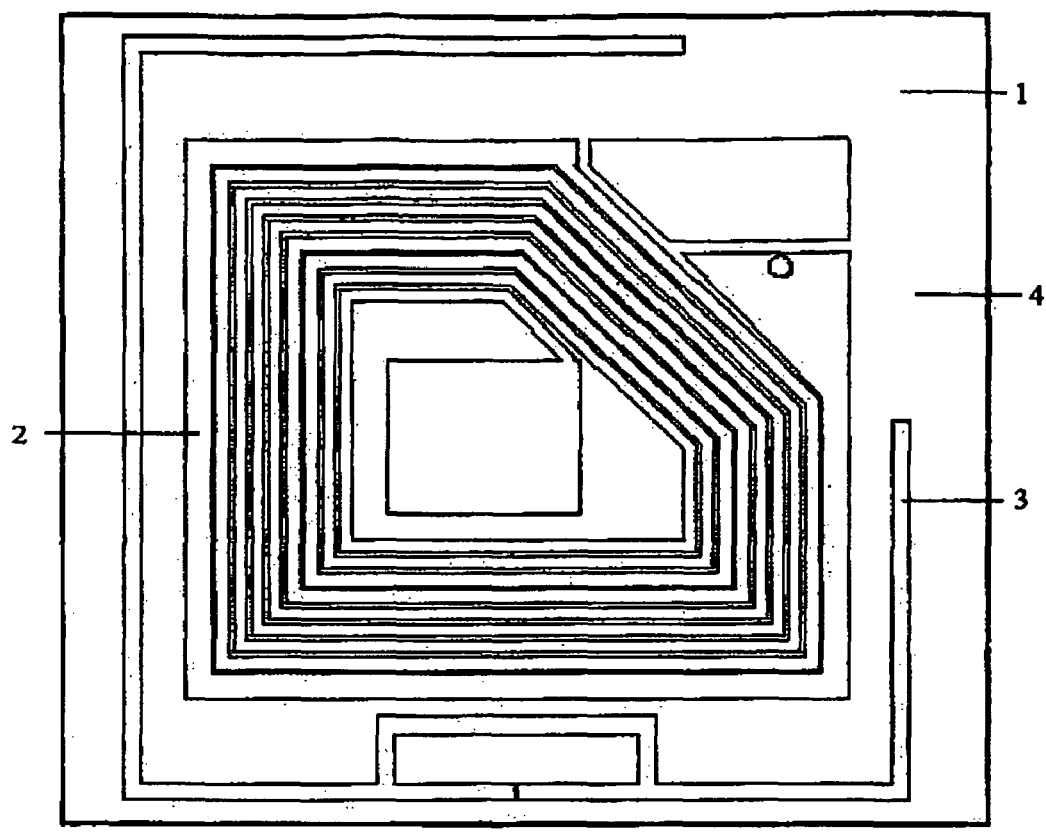
FIG. 1 shows a label 1 according to one embodiment of the invention: the EAS antenna 2 and UHF dipole antenna 3 are etched on the same side 6 (called the front side) of the substrate 4.
Figure 2:
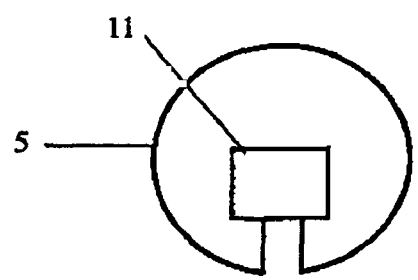
FIG. 2 shows the mini-antenna as a loop (self-induction coil) 5 with its integrated circuit 11.
Figure 3:
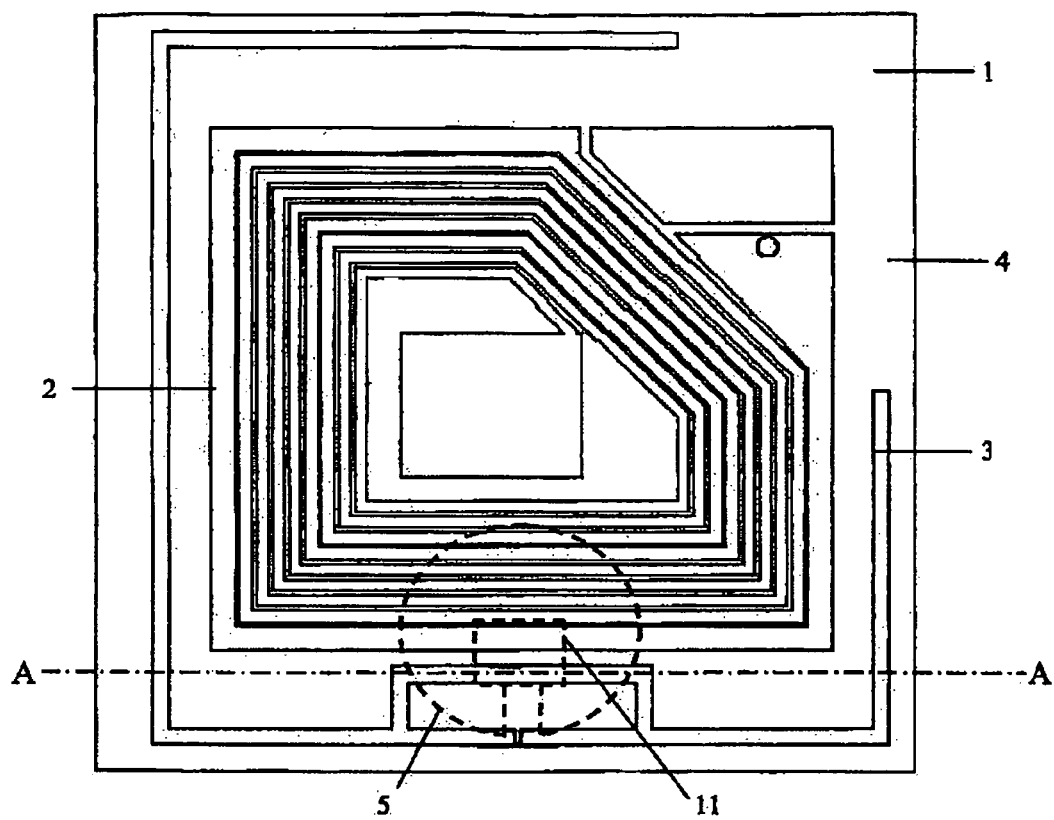
FIG. 3 shows a label 1 according to another embodiment of the invention: onto the label of FIG. 1, a loop 5 and an integrated circuit 11 are added onto the back side 7 of the substrate 4.
Figure 4:
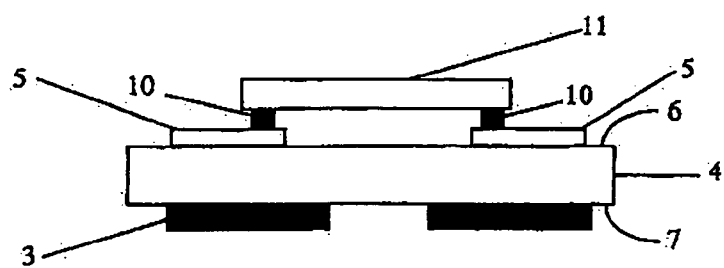
FIG. 4 shows a cross section along line A-A of the device of FIG. 3: the contacts 10 of integrated circuit 11 are in electrical contact with the strands of loop 5; loop 5 and integrated circuit 11 are deposited on the back side 7 of substrate 4, whereas the UHF dipole antenna is on the front side 6 of substrate 4.
Figure 5:
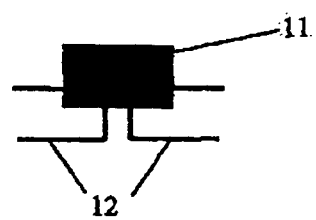
FIG. 5 shows the strap-type mini-antenna 12 with its integrated circuit 11.
Figure 6:
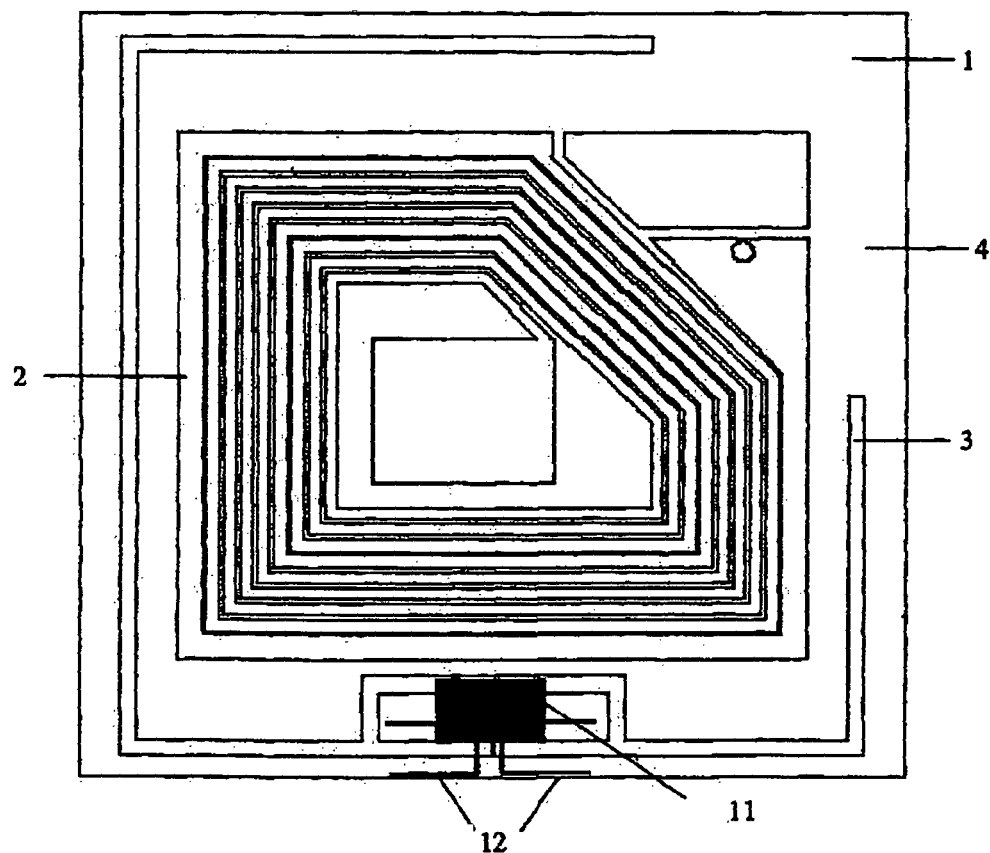
FIG. 6 shows label 1 according to yet another embodiment of the invention: a strap antenna 12 is added onto the label of FIG. 1, and an integrated circuit 11 is added on the front side 6 of the substrate 4.

The present invention associates on one and the same label a UHF antenna and an RFID transponder with an EAS antenna operating in RF mode, thus avoiding the addition of a second label on the product to be protected or tracked.

The first problem solved by the invention relates to the incorporation of two antennas on one and the same label: a first RF EAS anti-theft antenna operating preferably at resonance frequencies ranging from 2 to 10 MHz, and more preferably between 5 and 8 MHz; and a second UHF antenna operating preferably at resonance frequencies ranging from 0.8 to 2.5 GHz and whose function is the identification and tracking of objects.

RF EAS antennas are most often made of aluminum, based on subtractive aluminum technology (typically by etching) on both sides of a plastic support, for example a support made of polypropylene (PP) or of polyethylene terephthalate (PET). These antennas are typically shaped as a coil or as a closed loop. Once the RF EAS antenna has been formed on both sides of the substrate, a bridge must be devised in order to ensure the electrical continuity between the depositions on both sides, typically either by mechanical crimping or by a plated hole ("via"). The RF antenna of the EAS may not be used to resonate with an integrated circuit operating in UHF frequency ranges.

On the other hand, the inventor has observed that the RF EAS antenna manufacturing method routinely used by one skilled in the art makes it possible to manufacture, based on the same techniques as those used for the EAS antenna, a second antenna operating in UHF mode in the proximity of the former. This UHF antenna is typically a dipole antenna. It may be for example either a plain dipole antenna or a dipole antenna with an impedance adjustment loop.

In order not to hinder the proper operation of the two antennas, even if they are operating in very distant frequency ranges, a minimum separation distance must be maintained between the two antennas. In order to simplify the manufacturing method, the UHF antenna may be made concurrently with the RF EAS antenna.

In one specific embodiment, the EAS antenna and/or the UHF antenna are manufactured using a mechanical method for metal subtraction, for example, die cutting.

Another problem solved by the invention relates to the assembling of the UHF integrated circuit with the UHF antenna manufactured concurrently with the RF EAS antenna. Indeed, in order to obtain an optimal performance of the RF EAS antenna and to limit its cost, said antenna is generally deposited onto a substrate made of polypropylene or of PET. On this type of support, interconnection by way of flip-chip technology of an integrated circuit to the UHF aluminum antenna is difficult because, first, polypropylene does not withstand the temperatures needed for properly welding the integrated circuit, and, second, the overall system being highly flexible, the integrated circuit comes off easily when affixed in a conventional manner. These problems are probably the reasons why no one has yet considered depositing the RF EAS antenna and the UHF antenna on the same substrate.

In order to solve this problem and to enable a connection between the integrated circuit and the UHF antenna, one aspect of the invention consists in using a loop antenna made of aluminum, or of copper, or based on a conductive ink (deposited for example by serigraphy), or made of any other appropriate conductive material, to which an integrated circuit will be connected; this integrated circuit may operate by capacitive induction with the UHF antenna. The size of this loop antenna depends on the capacitance value of the integrated circuit. According to another embodiment of the invention, it will also be possible to connect the integrated circuit to a mini-antenna several millimeters in size, for example, a strap dipole mini-antenna. Said strap antenna may be either crimped to the UHF antenna or electrically bonded with a conductive glue.

According to the invention, the capacitive integrated circuit will be coupled to an antenna of the self-induction coil type, for example, a loop antenna, that operates as a magnetic resonator. The size of this self-induction coil antenna must be such that it can be LC resonant based on the formula $F=1/(2\pi\sqrt{LC})$, F being here the integrated circuit capacitance. This self-induction coil antenna is advantageously embodied as a loop or as a mini-strand. It operates by induction with the UHF antenna whose strands are so sized that it may operate at the desired frequencies.

The self-induction coil antenna may be made of aluminum, copper, conductive ink or of any other suitable conductive material, preferably on a substrate made of plastic such as PET or any other plastic material with sufficient heat resistance. The antenna inductance is determined based on the capacitive value of the integrated circuit 11. Normally, the self-induction coil antenna is smaller, i.e., shorter, than the UHF antenna; a mini-antenna may fit the purpose. The integrated circuit 11 is connected by flip-chip or by any other type of connection to the strands of the self-induction coil antenna 5. The integrated circuit 11 may be glued to the substrate onto which the loop or the mini-strand is deposited. For this mini-strand antenna (more commonly called a strap antenna), a strand length on the order of 2 to 3 mm per strand may be suitable, but the exact length is not critical.

The self-induction coil antenna 5, with the integrated circuit 11, on its substrate, preferably made of plastic, is then affixed, preferably with an adhesive, onto the front side 6 or the back side 7 of substrate 4, in the proximity of the UHF antenna. For example, the substrate comprising the self-induction coil antenna 5 and the integrated circuit 11 may be glued directly in contact with the UHF antenna, or onto a protective support covering the UHF antenna and the RF EAS antenna.

In one advantageous embodiment, the positioning of the self-induction coil antenna is accomplished by affixing it onto an adhesive that was previously deposited on the back side of the plastic or paper support of the HF and UHF antennas.

The self-induction coil antenna 5 is positioned opposite the two strands of the UHF antenna and operates as a radiating element.

When the integrated circuit 11 is placed with its self-induction coil antenna 5 opposite the two strands of the UHF antenna 3 serving large capacities, the latter antenna becomes completely insulated from the static electricity of the radiating element located on the other side of the circuit.

The insulation makes it possible to touch the radiating element without having any physical contact with the integrated circuit, thereby avoiding any degradation of said antenna due to the action of static electricity.

The self-induction coil antenna operates by capacitive coupling with the UHF dipole antenna. This makes it possible to feed the integrated circuit by coupling and permits remote reading of the identifier stored in the memory of the integrated circuit 11.

In the case of a dipole mini-antenna (of the strap type), the resonance is simply produced by capacitive effect if the strap antenna is placed on the back side 7 of label 1, or by electrical conduction if the strap antenna is placed on the front side 6.

In one advantageous embodiment of the invention, the RF module in UHF mode may operate at a frequency of 850 to 950 MHz and at a frequency of 2.3 to 2.5 GHz with base stations operating at powers ranging from 100 mW to 16 W for on-the-fly, no-contact object identification, in accordance with the national regulations in force; whereas the anti-theft function may operate in radio-frequency mode between 2 and 10 MHz.

The self-induction coil antenna will allow the RFID device to operate in the near-field mode on objects containing either liquid (such as water) or metal.

Another object of the invention is a manufacturing method for the above-described transponder. The method consists of the following steps:
  (a) Manufacture of a self-induction coil antenna or depositing of a dipole antenna on a first substrate;
  (b) Positioning of an integrated circuit on said self-induction coil or dipole antenna, thus accomplishing a first assembly;
  (c) Manufacture of an intermediate product made up of an RF EAS antenna and a UHF antenna, both deposited on the same side of a second substrate;
  (d) Manufacture of a second assembly by positioning and affixing the first assembly accomplished at step (b) on the front side or the back side of said intermediate product opposite the UHF antenna made at step (c), and in which steps (a) and (b) are sequentially performed, and in which step (c) may be performed before, at the same time as, or after steps (a) and (b).

During the positioning and affixing of the first assembly accomplished at step (b), the affixing may be achieved by gluing with a standard adhesive. The self-induction coil or dipole antenna must be affixed opposite the UHF 3 antenna made at step (c), on the front side 6 or the back side 7 of the second substrate 4, so that the components of the first assembly may operate in capacitive coupling with the UHF antenna 3.

Steps (a) and (b) are sequentially performed. Step (c) is chronologically independent of steps (a) and (b) and may be performed in any order, for example, before, at the same time as, or after steps (a) and (b).

At step (c), the RF EAS antenna may be manufactured on both sides of the substrate, in which case a bridge between the two metal sides (typically this metal is aluminum) must be devised, typically either by crimping or by means of a via.

The integrated circuit may be connected to the self-induction coil antenna by flip-chip.

The RF EAS-HF and UHF antennas may be manufactured, for example, by etching of the aluminum, on rolls made of complex aluminum-plastic or aluminum-paper materials, in which the plastic may be for example polypropylene or PET.

Next the self-induction coil antenna 5 or the dipole antenna 12 and the integrated circuit 11 may be placed onto the back side 7 or the front side 6 of the substrate 4 according to a lamination method with an adhesive, or by any other suitable means or method. Advantageously the substrate 4 is made of a plastic material such as PET.

The invention also relates to using the above-described transponder in order to provide the anti-theft protection and/or traceability of objects thus protected, preferably both functions at once.

This method for using the label (called an "RFID/anti-theft label") consists of the following steps:
  a) the RFID/anti-theft label is joined to the product to be protected and/or tracked upon completion of the manufacturing of said product;
  b) the label integrated circuit is loaded with data D, and the RF EAS antenna is activated;
  c) the data D are read at least once between the exit from the manufacturing plant of said product and the deactivation of the EAS antenna upon checking out of the product at a point of sale;
  d) the EAS anti-theft antenna is deactivated upon checking out of a product at said point of sale;
knowing that steps a) and b) may be performed in any order, whereas steps c) and d) are performed in the order indicated, and after steps a) and b).

The EAS anti-theft operates in a conventional manner.

As regards the UHF part, the antenna of a reader transmits UHF waves that will energize the integrated circuit. The magnetic loop will operate by capacitive effect with the UHF dipole antenna that is preferably located in the periphery of the anti-theft antenna. Through the UHF antenna, the integrated circuit transmits data to the reader receiving antenna. These data can be such as to identify the object onto which the label is applied.

Figure 7:
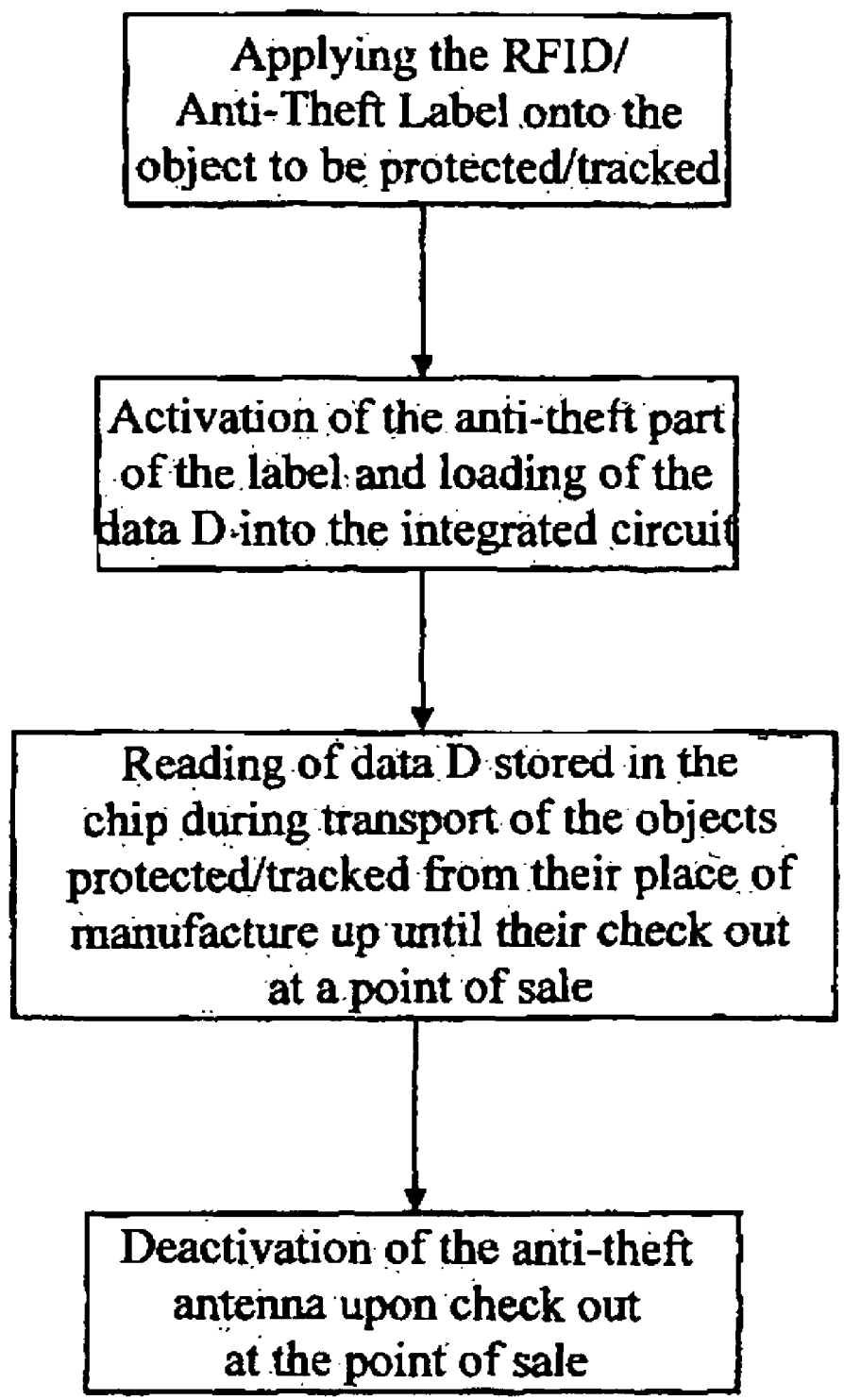
FIG. 7 shows a flow diagram relating to the method of using the label according to the invention along the logistic chain.

The method for using the device described hereinabove is, for example, described in FIG. 7:
  a) the RFID/anti-theft label is joined to the product to be protected and/or tracked upon completion of the manufacture of said product;
  b) the label integrated circuit is initialized with data D, and the RF EAS antenna is activated;
  c) the data D are read at least once between the exit from the manufacturing plant of said product and the deactivation of the EAS antenna upon checking out of the product at a point of sale;
  d) the EAS anti-theft antenna is deactivated upon checking out of the said product at said point of sale;
knowing that steps (a) and (b) may be performed in any order, whereas steps (c) and (d) are performed in the order indicated, and after steps (a) and (b). The data D are data relating to the product to be protected and/or tracked.

In the store, the main functions of the label claimed by the invention are an anti-theft function by means of the RF-HF EAS antenna, and an inventory management function by means of the RFID transponder.

This method of use offers numerous advantages. The use of the RFID/anti-theft label facilitates the source tagging of the objects and consumer goods by incorporating the traceability function in the same place and at the same time as the anti-theft system. This integration facilitates the deployment of RFID solutions and will limit the costs of RFID system integration at the article level.

Example

An EAS antenna was produced by aluminum etching on a first substrate made of polypropylene (PP) and in the form of a rolled-up sheet; said EAS antenna was designed to resonate at a frequency of approximately 8.2 MHz. Simultaneously, a UHF dipole antenna was produced, designed to resonate at a frequency of 915 MHz, 950 MHz, or 869 MHz (corresponding to three different embodiments, the frequency being selected based on the regulations in force in different countries). The EAS antenna was produced on both sides of the sheet, and the electrical continuity was achieved by mechanical crimping.

Next a loop mini-antenna was deposited on a second substrate made of PET, or of paper, by the deposition of a conductive ink. Then an integrated circuit was connected to this antenna. This second substrate with the loop antenna and the integrated circuit was then glued by means of a double-sided adhesive onto the back side of the first substrate made of PP.

The invention claimed is:

1. A label performing as an anti-theft electronic article surveillance (EAS) label and an ultra-high frequency (UHF) radio-frequency identification (RFID) transponder comprising:
   (a) a substrate comprising a plastic sheet;
   (b) an EAS loop antenna having a capacity to operate in radio-frequency mode; and
   (c) a transponder including an UHF dipole antenna, wherein the EAS loop antenna and the UHF dipole antenna are deposited on a common side of the substrate.

2. The label according to claim 1, further comprising:
   (i) a self-induction coil antenna or a strap dipole antenna, with
   (ii) an integrated circuit,
   wherein both (i) and (ii) are deposited on a front side or a back side of the substrate.

3. The label according to claim 2, wherein the self-induction coil antenna or the strap dipole antenna are provided on a support and the support is glued onto the front side or the back side of the substrate.

4. The label according to claim 3, wherein the support is a plastic sheet.

5. The method of manufacturing a label according to claim 3, wherein in step (d), said affixing of the first assembly on the front side or the back side of the intermediate product is by gluing.

6. The method of manufacturing a label according to claim 5, wherein in step (c), the RF EAS antenna and/or the antenna are provided according to subtractive metal technology.

7. The method of manufacturing a label according to claim 3, wherein in step (c), the RF EAS antenna and/or the antenna are provided according to subtractive metal technology.

8. A method of protecting and/or tracking a product by means of the label as claimed in claim 2, comprising:
   (a) joining the label to a product to be protected and/or tracked upon completion of manufacture of the product, and the label is a RFID/anti-theft label;
   (b) initializing the integrated circuit of the label with predetermined data D, and activating a RF EAS antenna;
   (c) reading the data D at least once between the product exiting a manufacturing plant of the product and deactivation of the RF EAS antenna upon purchasing of the product at a point of sale;
   (d) deactivating the RF EAS antenna upon purchase of the product at the point of sale,
   wherein steps (a) and (b) are performed in any order, and wherein steps (c) and (d) are performed in a sequential order as indicated and after steps (a) and (b).

9. The method according to claim 8, wherein the data D are data relating to the product.

10. A method of manufacturing a label, wherein the label performs as an anti-theft electronic article surveillance (EAS) label and an ultra-high frequency (UHF) radio-frequency identification (RFID) transponder comprising:
   (A) a substrate comprising a plastic sheet;
   (B) an EAS loop antenna having a capacity to operate in radio-frequency mode;
   (C) a transponder including an UHF dipole antenna; and
   (D) (i) a self-induction coil antenna or a strap dipole antenna, with (ii) an integrated circuit, wherein both (i) and (ii) are deposited on a front side or a back side of the substrate, the method comprising:
   (a) providing the self-induction coil antenna, or depositing the strap dipole antenna, on a first substrate;
   (b) positioning the integrated circuit on the self-induction coil antenna, or on the strap dipole antenna, to provide a first assembly;
   (c) providing an intermediate product including a radio frequency (RF) EAS antenna and an UHF antenna, both deposited, etched or fabricated on a common side of a second substrate;
   (d) providing a second assembly by positioning and affixing the first assembly of step (b) on a front side or a back side of the intermediate product opposite the UHF antenna of step (c), and
   wherein steps (a) and (b) are performed sequentially, and step (c) is performed before, at a same time as, or after steps (a) and (b).

11. A method of protecting and/or tracking a product by means of the label according to claim 10, comprising:
   (a) joining the label to a product to be protected and/or tracked upon completion of manufacture of the product, and the label is a RFID/anti-theft label;
   (b) initializing the integrated circuit of the label with predetermined data D, and activating a RF EAS antenna;
   (c) reading the data D at least once between the product exiting a manufacturing plant of the product and deactivation of the RF EAS antenna upon purchasing of the product at a point of sale;
   (d) deactivating the RF EAS antenna upon purchase of the product at the point of sale,
   wherein steps (a) and (b) are performed in any order, and wherein steps (c) and (d) are performed in a sequential order as indicated and after steps (a) and (b).

12. The method according to claim 11, wherein the data D are data relating to the product.

13. A method of manufacturing a label, wherein the label performs as an anti-theft electronic article surveillance (EAS) label and an ultra-high frequency (UHF) radio-frequency identification (RFID) transponder comprising:
   (A) a substrate comprising a plastic sheet;
   (B) an EAS loop antenna having a capacity to operate in radio-frequency mode;
   (C) a transponder including an dipole antenna; and
   (D) (i) a self-induction coil antenna or a strap dipole antenna, with (ii) an integrated circuit, wherein both (i) and (ii) are deposited on a front side or a back side of the substrate, and
   wherein the self-induction coil antenna or the strap dipole antenna are provided on a support and the support is glued onto the front side or the back side of the substrate, the method comprising:
   (a) providing the self-induction coil antenna, or depositing the strap dipole antenna, on a first substrate;

(b) positioning the integrated circuit on the self-induction coil antenna, or on the strap dipole antenna, to provide a first assembly;

(c) providing an intermediate product including a radio frequency (RF) EAS antenna and an antenna, both deposited, etched or fabricated on a common side of a second substrate;

(d) providing a second assembly by positioning and affixing the first assembly of step (b) on a front side or a back side of the intermediate product opposite the antenna of step (c), and wherein steps (a) and (b) are performed sequentially, and step (c) is performed before, at a same time as, or after steps (a) and (b).

14. The method of manufacturing a label according to claim 13, wherein in step (d), said affixing of the first assembly on the front side or the back side of the intermediate product is by gluing.

15. The method of manufacturing a label according to claim 13, wherein in step (c), the RF EAS antenna and/or the antenna are provided according to subtractive metal technology.

* * * * *